United States Patent
Singh

(10) Patent No.: US 11,900,343 B2
(45) Date of Patent: *Feb. 13, 2024

(54) PORTABLE ACCOUNT NUMBER FOR CONSUMER PAYMENT ACCOUNT

(71) Applicant: Visa International Service Association, San Francisco, CA (US)

(72) Inventor: Shantnu Singh, Singapore (SG)

(73) Assignee: Visa International Service Association, San Francisco, CA (US)

( * ) Notice: Subject to any disclaimer, the term of this patent is extended or adjusted under 35 U.S.C. 154(b) by 1039 days.

This patent is subject to a terminal disclaimer.

(21) Appl. No.: 16/454,770

(22) Filed: Jun. 27, 2019

(65) Prior Publication Data

US 2019/0318330 A1 Oct. 17, 2019

Related U.S. Application Data

(60) Continuation of application No. 14/965,561, filed on Dec. 10, 2015, now Pat. No. 10,373,133, which is a
(Continued)

(51) Int. Cl.
*G06Q 20/10* (2012.01)
*G06Q 20/20* (2012.01)
(Continued)

(52) U.S. Cl.
CPC ........... *G06Q 20/105* (2013.01); *G06Q 20/10* (2013.01); *G06Q 20/204* (2013.01);
(Continued)

(58) Field of Classification Search
CPC ...... G06Q 20/10; G06Q 20/385; G06Q 20/34; G06Q 20/401; G06Q 20/00; G06Q 20/105;
(Continued)

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

EP 2156397 2/2010
JP 2009507308 2/2009
(Continued)

OTHER PUBLICATIONS

AU2019200848, "First Examination Report", Nov. 25, 2019, 2 pages.
(Continued)

*Primary Examiner* — Ariel J Yu
*Assistant Examiner* — Denisse Y Ortiz Roman
(74) *Attorney, Agent, or Firm* — Kilpatrick Townsend & Stockton LLP

(57) ABSTRACT

A payment device for conducting a transaction is provided. The payment device includes a device substrate, a payment device identifier visibly located on the device substrate, and a data storage region contained on or within the payment device. The payment device identifier does not include information identifying an issuer for the payment device. The data storage region comprises a first data storage sub region containing data corresponding to the payment device identifier, and a second data storage sub region electronically isolated from the first data storage sub region and containing data identifying the issuer of the payment device.

10 Claims, 8 Drawing Sheets

Related U.S. Application Data division of application No. 12/893,834, filed on Sep. 29, 2010, now Pat. No. 9,245,267.

(60) Provisional application No. 61/310,161, filed on Mar. 3, 2010.

(51) Int. Cl.
  *G06Q 40/02* (2023.01)
  *G06Q 20/40* (2012.01)
  *G06Q 20/34* (2012.01)

(52) U.S. Cl.
  CPC ......... *G06Q 20/341* (2013.01); *G06Q 20/352* (2013.01); *G06Q 20/40* (2013.01); *G06Q 20/409* (2013.01); *G06Q 40/02* (2013.01)

(58) Field of Classification Search
  CPC .. G06Q 20/227; G06Q 20/32; G06Q 20/3552; G06Q 20/357; G06Q 20/363; G06Q 20/3823; G06Q 20/405; G06Q 2220/00; G06Q 20/204; G06Q 40/02; G06Q 20/40; G06Q 20/341; G06Q 20/352; G06Q 20/409
  USPC .......................................................... 705/17
  See application file for complete search history.

(56) References Cited

U.S. PATENT DOCUMENTS

| | | |
|---|---|---|
| 5,877,482 A | 3/1999 | Reilly |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,098,053 A | 8/2000 | Slater |
| 6,163,771 A | 12/2000 | Walker et al. |
| 6,227,447 B1 | 5/2001 | Campisano |
| 6,236,981 B1 | 5/2001 | Hill |
| 6,243,689 B1 | 6/2001 | Norton |
| 6,267,292 B1 | 7/2001 | Walker et al. |
| 6,302,326 B1 | 10/2001 | Symonds et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,184,979 B1 | 2/2007 | Carson |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,254 B1 | 10/2010 | Ma |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,983,994 B2 | 7/2011 | Hurry |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |

(56) References Cited

U.S. PATENT DOCUMENTS

| | | |
|---|---|---|
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,490 B2 | 11/2013 | Von Mueller et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,183,553 B2 | 11/2015 | Wang |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,760,873 B1 | 9/2017 | Cook |
| 9,773,243 B1 | 9/2017 | Spies |
| 9,922,322 B2 | 3/2018 | Flurscheim et al. |
| 9,978,061 B2 | 5/2018 | Park et al. |
| 10,096,009 B2 | 10/2018 | McGuire |
| 10,257,185 B2 | 4/2019 | Wong et al. |
| 10,325,261 B2 | 6/2019 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0121969 A1* | 7/2003 | Wankmueller ........ G07F 7/1008 235/379 |
| 2003/0126094 A1* | 7/2003 | Fisher .................... G06Q 20/10 705/75 |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0038742 A1 | 2/2005 | Kashiwada |
| 2005/0080728 A1 | 4/2005 | Sobek |
| 2005/0080730 A1 | 4/2005 | Sorrentino |
| 2005/0108178 A1 | 5/2005 | York |
| 2005/0119978 A1 | 6/2005 | Ates |
| 2005/0127164 A1 | 6/2005 | Wankmueller |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2005/0283436 A1 | 12/2005 | Greer et al. |
| 2006/0064372 A1 | 3/2006 | Gupta |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0007333 A1 | 1/2007 | Foss et al. |
| 2007/0055630 A1 | 3/2007 | Gauthier et al. |
| 2007/0107044 A1 | 5/2007 | Yuen et al. |
| 2007/0129955 A1 | 6/2007 | Dalmia et al. |
| 2007/0136193 A1* | 6/2007 | Starr ...................... G07F 7/025 705/41 |
| 2007/0136211 A1* | 6/2007 | Brown ................ G06Q 20/385 705/75 |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2007/0294182 A1 | 12/2007 | Hammad |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0071680 A1 | 3/2008 | Sheets |
| 2008/0091944 A1* | 4/2008 | von Mueller .......... G06Q 20/12 713/168 |

(56) References Cited

U.S. PATENT DOCUMENTS

| | | |
|---|---|---|
| 2008/0179394 A1 | 7/2008 | Dixon et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1* | 1/2009 | Brown ............... H04L 9/32 705/64 |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0070583 A1 | 3/2009 | Von Mueller et al. |
| 2009/0076938 A1* | 3/2009 | Patterson ............ G06Q 40/025 705/35 |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0240592 A1 | 9/2009 | Baumgart et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0287085 A1 | 11/2010 | Joubert et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0218871 A1 | 9/2011 | Singh |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2011/0307710 A1 | 12/2011 | McGuire et al. |
| 2012/0023567 A1 | 1/2012 | Hammad |
| 2012/0024946 A1 | 2/2012 | Tullis et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |

(56) References Cited

U.S. PATENT DOCUMENTS

| | | |
|---|---|---|
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339247 A1 | 12/2013 | Lam et al. |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0148197 A1 | 5/2016 | Dimmick |
| 2016/0171458 A1 | 6/2016 | Singh |
| 2016/0171479 A1 | 6/2016 | Prakash |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0238942 A1 | 8/2016 | Cash et al. |
| 2016/0268405 A1 | 9/2016 | Alexander |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |
| 2018/0075081 A1 | 3/2018 | Chipman |

FOREIGN PATENT DOCUMENTS

| | | |
|---|---|---|
| KR | 1020090104069 | 10/2009 |
| WO | 0135304 | 5/2001 |
| WO | 2004042536 | 5/2004 |
| WO | 2006113834 | 10/2006 |
| WO | 2008083089 | 7/2008 |
| WO | 2009032523 | 3/2009 |
| WO | 2009035469 | 3/2009 |

(56) References Cited

FOREIGN PATENT DOCUMENTS

| | | |
|---|---|---|
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS https://www.pcisecuritystandards.org/pdfs/pci_ssc_quick_guide.pdf, 2009.

"Magnetic Stripe Tracks", Avalable Online at URL: https://kilpatrick.foundationip.com/ksIP/navigation/navigation!showMain.action?showSearch=true&topFrameSearchCriteria=serialNo&topFrameSearchValue=14%2F965%2C561, 2010.

"Petition for Inter Partes Review of U.S. Pat. No. 8,533,860", Challenging Claims 1-30 Under 35 U.S.C. § 312 and 37 C.F.R. § 42.104, Before the USPTO Patent Trial and Appeal Board, IPR 2016-00600, Feb. 17, 2016, 65 pages.

U.S. Appl. No. 14/600,523, "U.S. Patent Application No.", Secure Payment Processing Using Authorization Request, filed Jan. 20, 2015, 42 pages.

U.S. Appl. No. 14/952,444, "U.S. Patent Application No.", Tokenization Request Via Access Device, filed Nov. 25, 2015, 78 pages.

U.S. Appl. No. 14/952,514, "U.S. Patent Application No.", Systems Communications With Non-Sensitive Identifiers, filed Nov. 25, 2015, 72 pages.

U.S. Appl. No. 14/955,716, "U.S. Patent Application No.", Provisioning Platform for Machine-To-Machine Devices, filed Dec. 1, 2015, 61 pages.

U.S. Appl. No. 14/966,948, "U.S. Patent Application No.", Automated Access Data Provisioning, filed Dec. 11, 2015, 52 pages.

U.S. Appl. No. 15/004,705, "U.S. Patent Application No.", Cloud-Based Transactions With Magnetic Secure Transmission, filed Jan. 22, 2016, 161 pages.

U.S. Appl. No. 15/008,388, "U.S. Patent Application No.", Methods for Secure Credential Provisioning, filed Jan. 27, 2016, 89 pages.

U.S. Appl. No. 15/011,366, "U.S. Patent Application No.", Token Check Offline, filed Jan. 29, 2016, 60 pages.

U.S. Appl. No. 15/019,157, "U.S. Patent Application No.", Token Processing Utilizing Multiple Authorizations, filed Feb. 9, 2016, 62 pages.

U.S. Appl. No. 15/041,495, "U.S. Patent Application No.", Peer Forward Authorization of Digital Requests, filed Feb. 11, 2016, 63 pages.

U.S. Appl. No. 15/265,282, "U.S. Patent Application No.", Self-Cleaning Token Valut, filed Sep. 14, 2016, 52 pages.

U.S. Appl. No. 15/462,658, "U.S. Patent Application No.", Replacing Token On a Multi-Token User Device, dated Mar. 17, 2017, 58 pages.

U.S. Appl. No. 61/738,832, "U.S. Provisional Application No.", Management of Sensitive Data, dated Dec. 18, 2012, 22 pages.

U.S. Appl. No. 61/751,763, "U.S. Provisional Application No.", Payments Bridge, filed Jan. 11, 2013, 64 pages.

U.S. Appl. No. 61/879,632, "U.S. Provisional Application No.", Systems and Methods for Managing Mobile Cardholder Verification Methods, filed Sep. 18, 2013, 55 pages.

U.S. Appl. No. 61/892,407, "U.S. Provisional Application No.", Issuer Over-The-Air Update Method and System, filed Oct. 17, 2013, 28 pages.

U.S. Appl. No. 61/894,749, "U.S. Provisional Application No.", Methods and Systems for Authentication and Issuance of Tokens in a Secure Environment, filed Oct. 23, 2013, 67 pages.

U.S. Appl. No. 61/926,236, "U.S. Provisional Application No.", Methods and Systems for Provisioning Mobile Devices With Payment Credentials and Payment Token Identifiers, filed Jan. 10, 2014, 51 pages.

U.S. Appl. No. 62/000,288, "U.S. Provisional Application No.", Payment System Canonical Address Format, filed May 19, 2014, 58 pages.

U.S. Appl. No. 62/003,717, "U.S. Provisional Application No.", Mobile Merchant Application, filed May 28, 2014, 58 pages.

U.S. Appl. No. 62/024,426, "U.S. Provisional Application No.", Secure Transactions Using Mobile Devices, filed Jul. 14, 2014, 102 pages.

U.S. Appl. No. 62/037,033, "U.S. Provisional Application No.", Sharing Payment Token, filed Aug. 13, 2014, 36 pages.

U.S. Appl. No. 62/038,174, "U.S. Provisional Application No.", Customized Payment Gateway, filed Aug. 15, 2014, 42 pages.

U.S. Appl. No. 62/042,050, "U.S. Provisional Application No.", Payment Device Authentication and Authorization System, filed Aug. 26, 2014, 120 pages.

U.S. Appl. No. 62/053,736, "U.S. Provisional Application No.", Completing Transactions Without a User Payment Device, filed Sep. 22, 2014, 31 pages.

U.S. Appl. No. 62/054,346, "U.S. Provisional Application No.", Mirrored Token Vault, filed Sep. 23, 2014, 38 pages.

U.S. Appl. No. 62/103,522, "U.S. Provisional Application No.", Methods and Systems for Wallet Provider Provisioning, filed Jan. 14, 2015, 39 pages.

U.S. Appl. No. 62/108,403, "U.S. Provisional Application No.", Wearables With NFC HCE, filed Jan. 27, 2015, 32 pages.

U.S. Appl. No. 62/117,291, "U.S. Provisional Application No.", Token and Cryptogram Using Transaction Specific Information, filed Feb. 17, 2015, 25 pages.

U.S. Appl. No. 62/128,709, "U.S. Provisional Application No.", Tokenizing Transaction Amounts, filed Mar. 5, 2015, 30 pages.

PCT/US2011/027077, "International Search Report and Written Opinion", Oct. 18, 2011, 10 pages.

Simon, "What Are Those Numbers On My Credit Card?", Available online at: https://www.creditcards.com/credit-card-news/credit-card-appearance-1268.php, Sep. 6, 2006, 5 pages.

\* cited by examiner

PORTABLE ACCOUNT NUMBER FOR CONSUMER PAYMENT ACCOUNT

CROSS REFERENCE TO RELATED APPLICATIONS

This application is a continuation of U.S. patent application Ser. No. 14/965,561 filed Dec. 10, 2015 which is a divisional application of U.S. Non-provisional patent application Ser. No. 12/893,834, filed on Sep. 29, 2010 (now U.S. Pat. No. 9,245,267), entitled "Portable Account Number for Consumer Payment Account," which claims priority from U.S. Provisional Patent Application No. 61/310,161, entitled "Portable Account Number for Consumer Payment Account," filed Mar. 3, 2010. The contents of these applications are hereby incorporated in their entirety by reference for all purposes.

BACKGROUND

Embodiments of the present invention are directed to systems, apparatuses and methods for conducting transactions such as payment transactions and for processing transaction data, and more specifically, to the use of an issuer independent primary account number (PAN) or other form of payment account or device identifier for conducting transactions. Embodiments of the invention implement a payment transaction using a payment account number or payment device identifier which does not include a bank identification number (BIN) or other identifier of the issuer of a payment device. The decoupling of the issuer identifier from the PAN provides a portable and customizable account number that enables greater freedom for consumers and provides the ability to deliver new and improved services to consumers who use payment cards (e.g., credit, debit or prepaid cards) with magnetic stripes or contactless elements embedded in other form factors as payment devices for conducting payment transactions.

Consumer payment devices such payment cards with magnetic stripes, or contactless chips embedded in other devices are used by millions of people worldwide to facilitate various types of commercial transactions. In a typical transaction involving the purchase of a product or service at a merchant location, the payment device is presented at a point of sale terminal ("POS terminal") located at a merchant's place of business. A consumer may also initiate a payment transaction by providing payment data from a remote location to a merchant over a network such as the Internet. Transactions of this type are typically initiated using a computing device such as a personal computer or laptop computer. Transactions may also be initiated by using a mobile device such as a cell phone or personal digital assistant (PDA) that communicates with a merchant or service provider directly or indirectly over a wireless network. Transactions in which the consumer is not in the same physical location as a merchant, and hence where a payment device is not physically presented to the merchant, are termed "card not present" (CNP) transactions.

A consumer's payment device is typically identified by, or associated with a string of alphanumeric characters that is unique to each payment device. The string is submitted to a merchant, accessed from a payment device, or otherwise provided by a consumer when conducting a payment transaction. Typically, the string of characters is in a specified format, with one standard format being that of a bank identification number (BIN) as a prefix to an account identifier. In some cases, the combination of the BIN and the account identifier is termed a "primary account number" or PAN. The PAN may correspond to the number or alphanumeric string embossed on a credit card or debit card, for example. The BIN or its equivalent is a unique identifier for the bank or organization that acted as issuer for the payment device or for the payment account associated with the device. The BIN may be generated by a payment processing network, card association or network (such as Visa, MasterCard, or American Express), or other form of payment processor. The account identifier is an identifier for the consumer's individual payment account and may be generated by the issuer in accordance with its internal rules or processes. The combination of the BIN and account identifier represents a unique identifier for the consumer's payment account or payment device, and as noted, includes information regarding the issuer of the payment account or payment device.

However, as recognized by the inventor of the present invention, the coupling of the BIN to the account identifier (typically as a prefix to the account identifier) to create a unique PAN does have some disadvantages. For example, a consumer's PAN is typically changed every time they move their payment account to a different issuer, or desire to use a new payment device product provided by the same issuer. In the case of a consumer who has instructed certain merchants or service providers to automatically deduct or charge a specified amount to the consumer's payment account on a regular basis (such as a monthly payment for a loan, etc.), the consumer must notify every such merchant or service provider each time the consumer changes issuers or products offered by the same issuer. This is inconvenient and may lead to errors in which a merchant attempts to charge an amount to, or deduct an amount from, a cancelled or otherwise improper payment account. This situation also creates extra work for the consumer and is an inefficient and wasteful use of data processing resources. Further, the need to use a different combination of BIN and account identifier for each payment device or account increases the data processing and data storage requirements on the payment processing networks used to process payment transactions. The use of a combined BIN and account identifier for payment devices or accounts may also act to limit the types of payment products or combined payment and non-payment products that may be offered by issuers or by other organizations that do not wish to be constrained by the existing system (such as by requiring the involvement of a typical issuer in order to offer the product).

What is desired are a system, apparatus and method for providing consumers and issuers with a payment account or payment device identifier that can be used to conduct payment transactions and which overcomes the noted disadvantages of current methods of identifying such devices or accounts. Embodiments of the invention address these problems and other problems individually and collectively.

SUMMARY

Embodiments of the present invention are directed to a system, apparatus, and method for generating a payment account number or payment device identifier for use in conducting a payment transaction, and for enabling a consumer to use that identifier to conduct a payment transaction. In some embodiments of the invention, the bank identification number (BIN) is decoupled from the account identifier when generating the payment account number or payment device identifier (such as the primary account number or PAN). The BIN or its equivalent data that is used to control the routing of payment transaction data or messages to an issuer may be provided in one or more suitable ways, including but not limited to, as a data string in a separate data field from the account identifier (for magnetic stripes on payment cards, for example), as data in a new field that is stored in a chip or data storage element (for smart cards and other types of contact or contactless payment devices), or as data stored in a lookup table or database that is accessed based on the consumer's account number or payment device identifier.

In one embodiment, the present invention is directed to an apparatus for processing a transaction, where the apparatus includes an electronic processor programmed to execute a set of instructions, a data storage device coupled to the processor, and the set of instructions contained in the data storage device, wherein when the set of instructions are executed by the processor, the apparatus processes the transaction by receiving an authorization request message for the transaction, processing the authorization request message to obtain an account identifier for an account used to conduct the transaction, the account identifier not including information identifying an issuer for the account, accessing a data storage element that includes information associating the account identifier with information identifying the issuer for the account, obtaining the information identifying the issuer for the account from the data storage element, providing the authorization request message to the issuer using the information identifying the issuer for the account obtained from the data storage element and receiving from the issuer for the account an authorization response message containing a decision from the issuer whether to approve or deny the transaction.

In another embodiment, the present invention is directed to a method for processing a transaction, where the method includes receiving an authorization request message for the transaction, processing the authorization request message to obtain an account identifier for an account used to conduct the transaction, the account identifier not including information identifying an issuer for the account, determining, based on the account identifier, an issuer for the account, providing the authorization request message to the issuer using the information identifying the issuer for the account obtained from the data storage element, and receiving from the issuer for the account an authorization response message containing a decision from the issuer whether to approve or deny the transaction.

In yet another embodiment, the present invention is directed to a payment device for conducting a transaction, where the payment device includes a device substrate, a payment device identifier visibly located on the device substrate, the payment device identifier not including information identifying an issuer for the payment device, and a data storage region contained on or within the payment device, the data storage region further comprising a first data storage sub region containing data corresponding to the payment device identifier, and a second data storage sub region electronically isolated from the first data storage sub region and containing data identifying the issuer of the payment device.

Other objects and advantages of the present invention will be apparent to one of ordinary skill in the art upon review of the detailed description of the present invention and the included figures.

DETAILED DESCRIPTION

Figure 1:
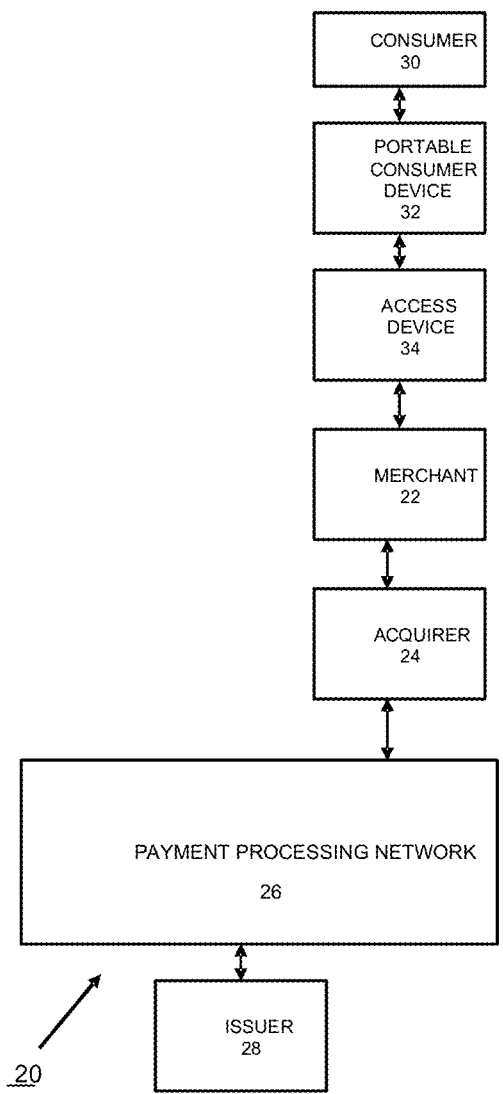
FIG. 1 is a functional block diagram illustrating the primary functional elements of an exemplary system for conducting an electronic payment transaction and processing payment transaction data that may be used in implementing an embodiment of the present invention.

Embodiments of the present invention are directed to a system, apparatus, and method for generating a payment account or payment device identifier for use in conducting a payment transaction, and for enabling a consumer to use that identifier to conduct a payment transaction. Embodiments of the present invention are also directed to methods of conducting a payment transaction using a payment account or payment device identifier. In some embodiments of the invention, the bank identification number (BIN) is decoupled from the account identifier when generating a payment account number or payment device identifier. This results in a payment account number or payment device identifier (e.g., a PAN or other account number such as is found on a credit or debit card) that does not have the BIN as a prefix. The BIN or its equivalent data that is used for routing of payment transaction data or messages to an issuer (and in some situations may be used to control the processing of payment transaction data in accordance with issuer instructions) may be provided in one or more suitable ways, including but not limited to, as a data string in a separate data field from the account identifier (for magnetic stripes on payment cards, for example), as data in a new field that is stored in a chip or data storage element (for smart cards, contact or contactless payment devices, etc.), or as data stored in a lookup table or database that is accessed based on the consumer's payment account number or payment device identifier.

Embodiments of the present invention may provide the ability to generate payment account numbers that are independent of an issuer. This enables a greater number of unique payment account numbers to be generated, enables a consumer to personalize or otherwise provide input into the structure of the payment account number (perhaps with the result of a consumer being able to have a single, more easily remembered number), and also enables the use of a payment account number that includes data that may be used to identify a market segment or provide another form of market differentiation in a payment product. Embodiments of the present invention may also increase the types of payment or identification products that are available, as well as increase the adoption of such products. For example, new types of combined payment and non-payment products (e.g., transit system use, loyalty and incentive redemption services, medical record data, etc.) that are not tied to a specific issuer could be developed by businesses, governmental agencies, billing services, telecommunications service providers, etc. The present invention may permit easier development and distribution of such products and encourage innovation in this area.

Embodiments of the present invention are typically implemented in the context of a payment transaction, and specifically, in the context of the processing of transaction data as part of a transaction authorization process. In a typical payment transaction, a consumer provides a payment account number or payment device identifier to a merchant or service provider. The payment account number or payment device identifier may be provided in the form of a card (e.g., a magnetic stripe card or smart card with an embedded chip) accessed by a point of sale terminal or card reader, or payment account information may be provided by the consumer in a card not present situation (e.g., over a network as in an eCommerce transaction). Payment account or payment device identifier data may also be provided by a contactless element such as a chip embedded in a mobile phone, PDA, or other device that can function to make a payment for a transaction.

In order to provide a context in which the present invention may be implemented, a brief discussion of the entities involved in processing and authorizing a payment transaction and their roles in the processing of payment transaction data, will be presented. FIG. 1 is a functional block diagram illustrating the primary functional elements of an exemplary system 20 for conducting an electronic payment transaction and processing payment transaction data that may be used in implementing an embodiment of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "acquirer" is typically a business entity (e.g., a commercial bank) that has a business relationship with a particular merchant. An "issuer" is typically a business entity (e.g., a bank or credit union) which issues a payment device such as a credit card, debit card, smart card, or contactless device to a consumer and which provides administrative and management functions for the consumer's payment account. Some entities may perform both issuer and acquirer functions.

As shown in FIG. 1, in a typical transaction, a consumer 30 wishing to purchase a good or service from a merchant provides transaction data that may be used as part of a transaction authorization process, typically by means of a portable consumer device 32 that is capable of functioning as a payment device. Consumer 30 may utilize a portable payment device 32 such as a card having a magnetic strip encoded with account data or other relevant data (e.g., a standard credit or debit card) to initiate the transaction. In an eCommerce (electronic commerce) transaction, the consumer may enter data into a consumer device capable of communicating with a merchant or other element of system 20, such as a laptop or personal computer. The consumer may also initiate the transaction using data stored in and provided from a suitable form of data storage device (such as a smart card, mobile phone or PDA containing a contactless element, or a transportable memory device). As examples, a card or similar payment device may be presented to a point of sale terminal which scans or reads data from that card. Similarly, a consumer may enter payment account data into a computing device as part of an eCommerce transaction. Further, a consumer may enter payment account data into a cell phone or other device capable of wireless communication (e.g., a laptop computer or personal digital assistant (PDA)) and have that data communicated by the device to the merchant, the merchant's data processing system, or a transaction authorization network. A wireless device may also be used to initiate a payment transaction by means of communication between a contactless element embedded within the device and a merchant device reader or point of sale terminal using a near field communications (NFC) or short range communications mechanism, such as RF, infra-red, optical, etc. Thus, in some cases an access device 34 may be used to read, scan, or otherwise interact with a consumer's portable payment device and thereby obtain data used in conducting a payment transaction.

The payment account data (and if needed for processing the transaction, other consumer data) is obtained from the consumer's device and provided to the merchant 22 or to the merchant's data processing system. The merchant or merchant's data processing system (which may include a point of service terminal or other type of access device) generates a transaction authorization request message that may include data obtained from the consumer's payment device as well as other data related to the transaction and the merchant. As part of generating the authorization request message, the merchant 22 or the merchant's transaction data processing system may access a database which stores data regarding the consumer, the consumer's payment device, or the consumer's transaction history with the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to Payment Processing Network 26, which among other functions, participates in the clearance and settlement processes which are part of the overall transaction processing. As part of the transaction authorization process, an element of Payment Processing Network 26 may access an account database which contains information regarding the consumer's payment history, chargeback or dispute history, credit worthiness, etc. Payment Processing Network 26 communicates with issuer 28 as part of the authorization process, where issuer 28 is the entity that issued the payment device to the consumer and provides administrative and management services for the consumer's payment account. Consumer account data is typically stored in a consumer database which is accessed by issuer 28 as part of the transaction authorization and account management processes.

In standard operation, an authorization request message is created during a consumer purchase (or proposed purchase) of a good or service at a point of sale (POS). The point of sale may be a merchant's physical location or a virtual point of sale such as a web-site that is part of an eCommerce transaction. In a typical transaction, the authorization request message is sent from the point of sale (e.g., the merchant or the merchant's transaction data processing system) to the merchant's acquirer 24, then to the Payment Processing Network 26, and then to the appropriate issuer 28. An authorization request message can include a request for authorization to conduct an electronic payment transaction. It may include one or more of an account holder's primary account number (PAN; or, as will be described with reference to embodiments of the present invention, an account or payment device identifier), payment device expiration date, currency code, sale amount, merchant transaction stamp, acceptor city, acceptor state/country, etc. An authorization request message may be protected using a secure encryption method (e.g., 128-bit SSL or equivalent) in order to prevent data from being compromised.

Portable consumer device 32 (an example of a payment device) may be in any suitable form that can function as a payment device or that may incorporate a contactless chip or other element to enable it to function as a payment device. For example, suitable portable consumer devices can be hand-held and compact so that they can fit into a consumer's wallet and/or pocket (e.g., pocket-sized). They may include contact or contactless smart cards, credit or debit cards (typically with a magnetic strip and without an embedded microprocessor), keychain devices (such as the Speedpass™ commercially available from Exxon-Mobil Corp.), and depending upon the specific device, may incorporate a contactless element that is configured to enable the portable consumer device to function as a payment device. Other examples of suitable portable consumer devices include cellular phones, personal digital assistants (PDAs), pagers, payment cards, security cards, access cards, smart media, transponders, and the like, where such devices may incorporate a contactless element. Depending upon the specific design, the portable consumer device may function as one or more of a debit device (e.g., a debit card), a credit device (e.g., a credit card), or a stored value device (e.g., a stored value or prepaid card).

Payment Processing Network 26 may include data processing subsystems and networks, and be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for transactions.

Payment Processing Network 26 may include a server computer. A server computer is typically a powerful computer or cluster of computers. For example, the server computer can be a large mainframe, a minicomputer cluster, or a group of servers functioning as a unit. In one example, a server computer may be a database server coupled to a Web server. Payment Processing Network 26 may use any suitable wired or wireless network, including the Internet, to facilitate communications and data transfer between its component system elements.

Figure 2:
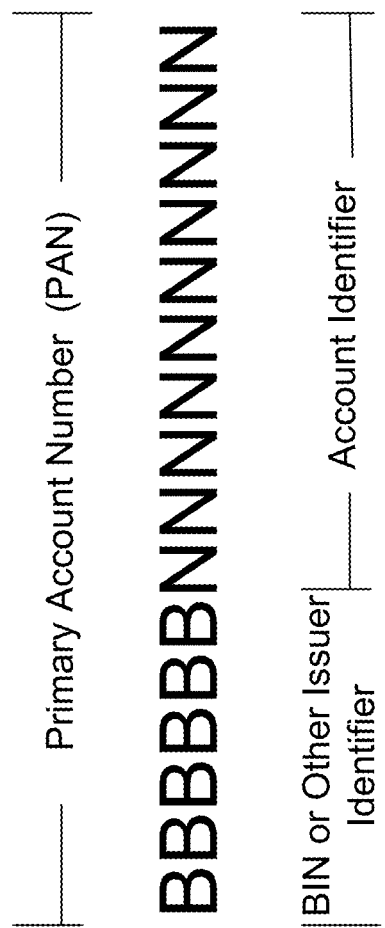
FIG. 2 is a diagram illustrating the components of a typical primary account number (PAN) that is used in the processing of a payment transaction.

FIG. 2 is a diagram illustrating the components of a typical primary account number (PAN) that is used in the processing of a payment transaction. The primary account number depicted in FIG. 2 may be a data string (numerical or alphanumerical) that is embossed on a credit or debit card (either a magnetic stripe card or a smart card with an embedded chip), or may be a data string that is stored in a data storage element of a embedded chip or other form of contactless element. Such an embedded chip or other form of contactless element may be incorporated into a mobile phone, key fob, laptop computer, PDA, or other device that may function as a payment device. As shown in the figure, in a typical PAN, the data string may be comprised of two sub-strings or components; a first (depicted as BBBBBB) that represents the issuer of the payment device, and a second (depicted as NNNNNNNNNN) that represents a payment account identifier. The issuer identifier (sometimes termed a bank identification number or BIN) is a data string that identifies the issuer of the payment device and is used by a payment processor (such as Visa) to route the transaction authorization message(s) and/or transaction data to the appropriate issuer for approval of a proposed payment transaction. The BIN may also serve to control the data processing operations applied to the transaction data so that such operations are performed in accordance with the desired procedures of the issuer. In a typical payment transaction, the generation of the PAN and processing of the transaction using the PAN may be performed as follows:

a payment processor (such as Visa) assigns a unique BIN to an issuing bank or other entity (e.g., a credit union);

the issuer generates a payment card or device for a consumer—the card or device identifier (e.g., the PAN) uses the issuer's BIN as a prefix to an account identifier;

the consumer conducts a payment transaction using the card or device, and the transaction data and card or device identifier are forwarded to the payment processor;

the payment processor uses the first 6 digits of the card or device identifier (i.e., the BIN) to identify the issuer;

the payment processor processes the transaction in accordance with any instructions defined by or for the issuer, and forwards an authorization request with the card or device identifier to the appropriate issuer; and the issuer makes a decision whether to approve or deny the transaction and sends a response indicating this decision back to the payment processor.

Although the payment card or payment device identifier (or payment account number) format described with reference to FIG. 2 has proven to be advantageous in enabling payment transactions, as recognized by the inventor of the present invention, it does have some disadvantages. These primarily arise because the format depicted in FIG. 2 ties the payment card or device identifier (e.g., the PAN) to a specific issuer. This may have one or more of the following (or other) undesirable effects:

(1) if a consumer wishes to change issuers, then they are required to obtain a new payment device and hence a new PAN;

(2) if a consumer desires to maintain the same issuer, but change the type or category of payment account they use (e.g., move to an account with different benefits, pricing structure, incentive programs, etc.), then they typically are required to obtain a new PAN;

(3) the PAN is generated by procedures defined by a payment processor and an issuer, and hence is a random or pseudo-random data string as far as a consumer is concerned—this does not assist a consumer to easily remember the PAN even if they use the payment account on a regular basis (and it is even more difficult to remember the PAN that should be used for a transaction if a consumer changes their PAN);

(4) given that the first set of characters (typically six) of a PAN are fixed, the number of unique combinations of BIN and account identifier that may be generated may not be sufficient to satisfy the increasing demand for payment accounts and market segment differentiated account offerings desired by issuers and/or consumers;

(5) as payment accounts and payment devices become used for more and more types of transactions (e.g., credit, debit, prepaid, government benefits, dual or multiple use applications (such as transit), etc.) consumers may find it more convenient (as well as increasing their confidence in the security of the device) to have their payment account number or payment device identifier decoupled from an issuer so that they may take advantage of products and services offered by non-banking entities;

(6) in the present system of assigning payment account or payment device identifiers, it is not possible to decouple the issuer identifier from the payment account number and to provide a consumer with a personalized account number—doing so may permit a consumer to have (or even to select) a payment account number that is easier for them to remember and use since it is not changed when they change issuers, etc.;

(7) continued growth in unique account numbers or device identifiers may place stress on the data processing resources used to process payment transactions—actions may need to be taken to curtail the growth in account numbers by consolidating all payment and multi-use accounts of a consumer into one identification number; and (8) issuers and payment processors may prefer to use the first (n) characters of a payment account number for purposes other than identifying an issuer, for example to segment a market by providing different characters for different levels of service, different incentive programs, etc.

Thus the current system and method of generating a payment account or payment device number by using an issuer identifier as a prefix to an account identifier creates limitations on the range of payment account or payment device numbers that can be generated by parties other than the issuer that is assigned a specific BIN or other identifier. This restricts other entities from issuing a payment device or creating a payment account for a consumer that uses a previously assigned BIN as a prefix for the data string that is associated with the account or device. It also acts to limit the uses to which the payment account number data can be used by consumers, issuers, and other entities that may seek to develop new products based on mixed use devices, market segmentation, etc.

Figure 3:
FIG. 3 is a diagram illustrating the components of a payment account or payment device identifier that may be used in implementing an embodiment of the present invention.

In recognition of the noted (and other) limitations of the presently used format for a payment account number, such as that depicted in FIG. 2, the inventor of the present invention developed the novel format depicted in FIG. 3, which is a diagram illustrating the components of a payment account number or payment device identifier that may be used in implementing an embodiment of the present invention. As shown in the figure, the inventive payment account number or payment account identifier is a numeric or alphanumeric string (depicted as NNNNNNNNNNNNNNNN in the figure), which in contrast to the format depicted in FIG. 2, does not have the BIN or other issuer identifier as a prefix. As will be described, depending on the type of payment device being used by a consumer (e.g., a card with magnetic stripe, smart card, device with embedded chip) and the type of transaction involved (e.g., a card present or a card not present transaction), the inventive payment account number or payment device identifier may be implemented in one or more suitable ways, with a payment transaction that is conducted using that payment device being processed in a manner that depends upon that implementation.

Although in some embodiments the inventive payment account number or payment device identifier may be of the format described with reference to FIG. 3, it should be noted that this is not the only possible format that may be used when practicing the present invention. Other formats or arrangements of numeric or alphanumeric data are possible and fall within the underlying concepts of the present invention, with such formats or arrangements being understood as those in which the payment account number or device identifier does not include a BIN or similar form of issuer identifier.

In a first possible implementation, such as one suited for use with a payment card (e.g., credit card or debit card) having a magnetic stripe, the inventive payment account number or payment device identifier is encoded as data present on the magnetic stripe. However, in contrast to the format and data processing described with reference to FIG. 2, in this implementation the payment account number (or in this case the card number, which is typically embossed on the card face) does not include the BIN or other issuer identifier data. Instead, the BIN, issuer identifier data, or its equivalent is encoded as a data string (typically numeric or alphanumeric) in a location, track or field on the magnetic stripe that differs from that of the payment account number. When a consumer conducts a transaction with the payment device, the payment account number and the issuer identifier are read from the payment device, typically by a second device such as a card reader or point of sale terminal. The issuer identifier is provided to the payment processor and used to route the transaction authorization request to the appropriate issuer and/or process the transaction in accordance with the desired data processing operations of the issuer. Thus, in this implementation, both a credit card or debit card number (such as that embossed on the face of the card) and a separate issuer identifier data string would be read from two different data storage locations, tracks or fields of the magnetic stripe and provided to a payment processor. The processing of a payment transaction using the payment device would then continue as was described with reference to the standard format depicted with reference to FIG. 2; the payment processor processes the transaction in accordance with any instructions defined by or for the issuer, forwards an authorization request with the card or device identifier to the appropriate issuer, and the issuer makes a decision whether to approve or deny the transaction and sends a response indicating this decision back to the payment processor.

Figure 7A:
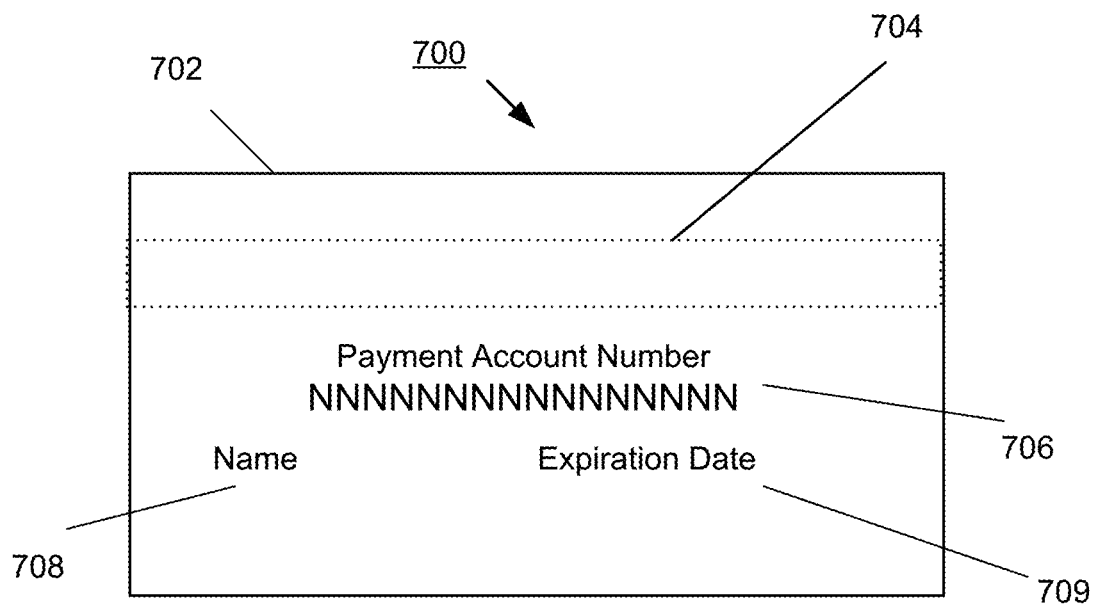
FIG. 7A is a diagram illustrating the front of a payment device having a magnetic stripe that may be used to conduct a transaction and that functions in accordance with the first implementation of the present invention.
Figure 7B:
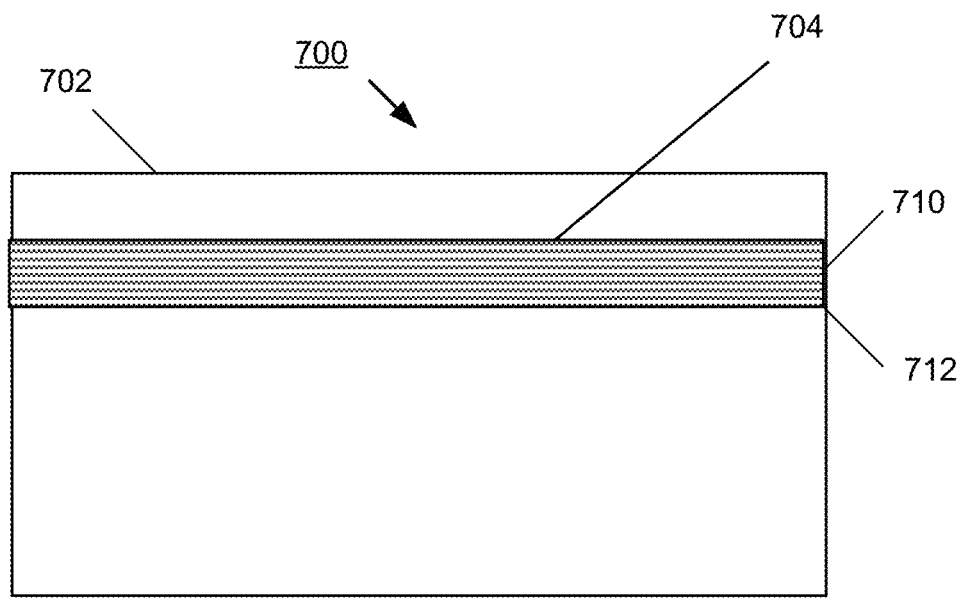
FIG. 7B is a diagram illustrating the back of a payment device having a magnetic stripe that may be used to conduct a transaction and that functions in accordance with the first implementation of the present invention.

FIGS. 7A-B are diagrams illustrating the front and back of a payment device 700 having a magnetic stripe that may be used to conduct a transaction and that functions in accordance with the first implementation of the present invention. As shown in the figures, payment device 700 is implemented in the form of a device substrate 702 that provides the form factor for the device. Payment device 700 also includes a magnetic stripe 704 which is typically affixed to the back of substrate 702 (as shown in FIG. 7B, and as indicated by an outline in FIG. 7A). As shown in FIG. 7A, the front of device 700 includes a visible identifier, such as payment account number 706 which is typically embossed onto substrate 702. As noted, in accordance with the present invention, payment account number 706 does not include data identifying the issuer of device 700. The front of device 700 also typically includes other data, such as the name 708 of the account holder and the expiration date 709 of the payment device. As shown in FIG. 7B, the back of device 700 includes magnetic stripe 704 which functions as a data storage region that is "read" or accessed by a card reader or other form of access device. Magnetic stripe 704 may include one or more distinct data storage sub-regions, such as "tracks" 710 and 712. As described with reference to the first implementation of the present invention, a first data storage sub-region such as track 710 (or a similar data storage region, location, etc.) contains the payment account number 706 shown on the front of device 700, while a second data storage sub-region such as track 712 (or a similar data storage region, location, etc.) contains the issuer identifier data.

In a second possible implementation, such as one suited for use with a payment device in the form of a smart card (i.e., a card form factor with an embedded chip that communicates using a contact or contactless interface) or in the form of a device with an embedded chip that communicates using a contactless interface and functions as a payment device (such as a mobile phone or PDA), the inventive payment account number or payment device identifier again does not include a BIN, issuer identifier data, or its equivalent. The payment account number or payment device identifier is stored in a first data storage element or memory location of the chip. The BIN, issuer identifier data, or its equivalent is encoded as a data string (typically numeric or alphanumeric) in a second and different data storage element or memory location of the chip. When a consumer conducts a transaction with the payment device, the payment account number and the issuer identifier are read from the device. The issuer identifier is provided to the payment processor and used to route the transaction authorization request to the appropriate issuer and/or process the transaction in accordance with the desired data processing operations of the issuer. Thus, in this implementation, both a payment account number or payment device identifier and a separate issuer identifier data string would be read from two different memory locations or data storage regions (or sub-regions) of the chip and provided to a payment processor. The processing of a payment transaction using the payment device would then continue as was described with reference to the standard format depicted with reference to FIG. 2; the payment processor processes the transaction in accordance with any instructions defined by or for the issuer, forwards an authorization request with the card or device identifier to the appropriate issuer, and the issuer makes a decision whether to approve or deny the transaction and sends a response indicating this decision back to the payment processor.

Figure 8A:
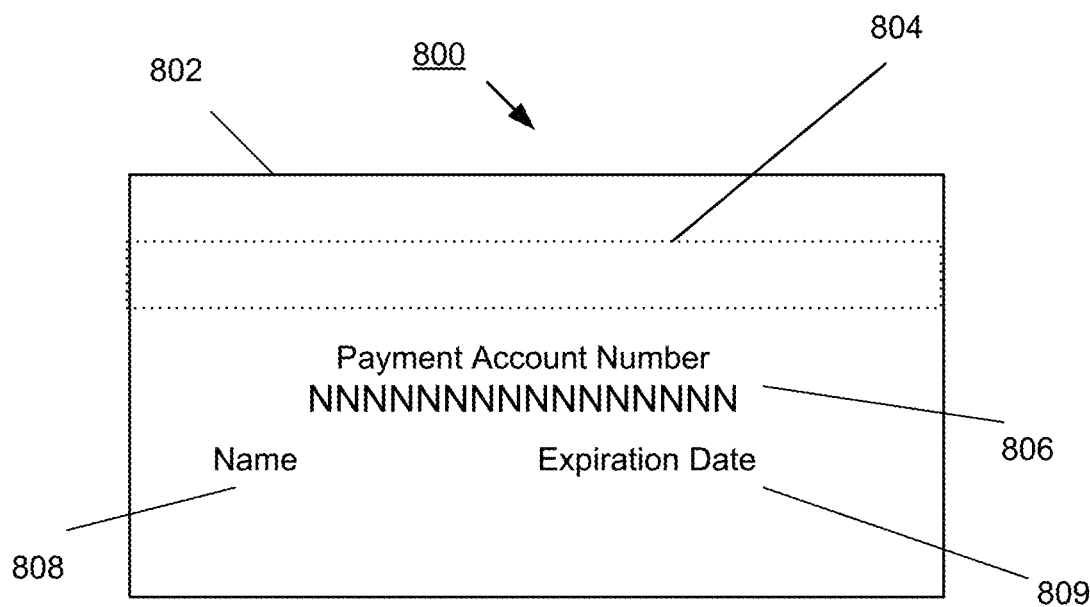
FIG. 8A is a diagram illustrating the front of a payment device in the form of a smart card having an embedded chip that may be used to conduct a transaction and that functions in accordance with the second implementation of the present invention.
Figure 8B:
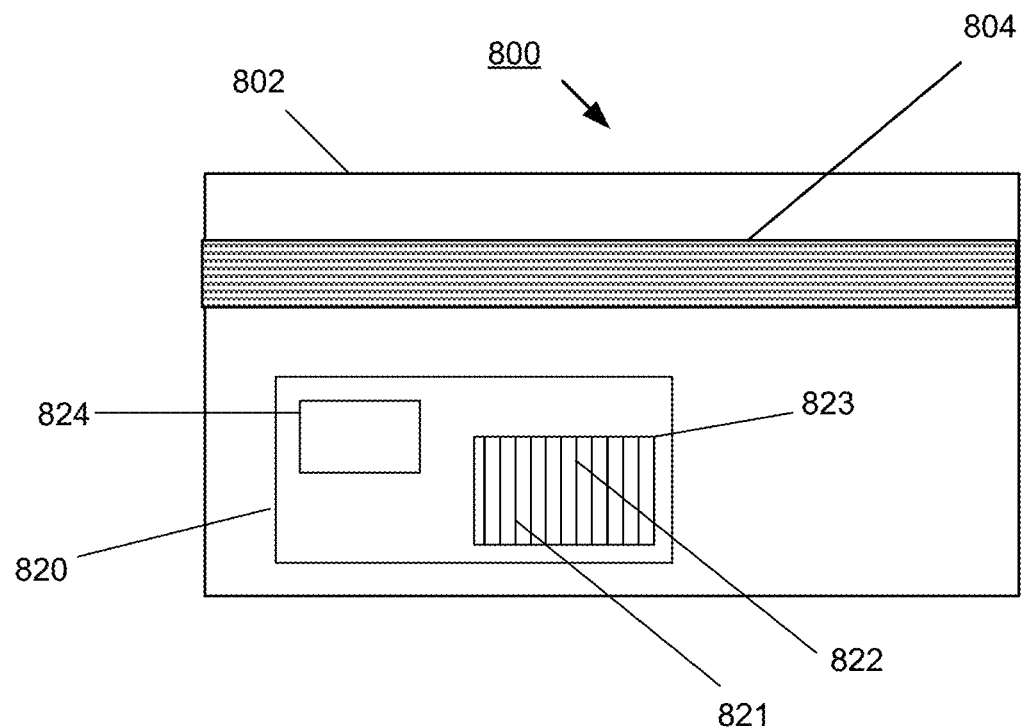
FIG. 8B is a diagram illustrating the back of a payment device in the form of a smart card having an embedded chip that may be used to conduct a transaction and that functions in accordance with the second implementation of the present invention.

FIGS. 8A-B are diagrams illustrating the front and back of a payment device 800 in the form of a smart card having an embedded chip that may be used to conduct a transaction and that functions in accordance with the second implementation of the present invention. As shown in the figures, payment device 800 is implemented in the form of a device substrate 802 that provides the form factor for the device. Payment device 800 also includes an embedded chip 820 (as shown in FIG. 8B). As shown in FIG. 8A, the front of device 800 includes a visible identifier, such as payment account number 806 which is typically embossed onto substrate 802. As noted, in accordance with the present invention, payment account number 806 does not include data identifying the issuer of device 800. The front of device 800 also typically includes other data, such as the name 808 of the account holder and the expiration date 809 of the payment device. Embedded chip 820 includes a memory or data storage region 823, that may include one or more distinct data storage sub-regions, such as data storage locations 821 and 822. As described with reference to the second implementation of the present invention, a first data storage sub-region such as data storage location 821 (or a similar data storage region, location, etc.) contains the payment account number 806 shown on the front of device 800, while a second data storage sub-region such as data storage location 822 (or a similar data storage region, location, etc.) contains the issuer identifier data.

Data stored in data storage region 823 of chip 820 may be accessed by a second device, such as a card reader or other from of access device. In some embodiments, the data may be accessed by means of a magnetic stripe 804 (as shown in FIG. 8B, and as indicated by an outline in FIG. 8A) which provides an interface to chip 820. In some embodiments, the data may be accessed by a second device such as a card reader or point of sale terminal using a contactless data transfer mechanism. In such a situation, embedded chip 820 includes a contactless interface 824 that enables data transfer using a contactless mode of operation. Contactless interface 824 may include the capability to communicate and transfer data using a near field communications (NFC) technology or other short range communications technology. Note that although in FIGS. 8A-B embedded chip 820 is shown as being associated with a smart card form of payment device, in some embodiments embedded chip 820 (and contactless interface 824) may be embedded into a mobile phone, pager, laptop computer, or other suitable forms of devices that may be made to function as a payment device.

In a third possible implementation that is suited for use with credit cards, debit cards, smart cards, or devices with embedded chips in eCommerce or other forms of card not present transactions (in which the payment device is not physically present at the same location as the merchant), the inventive payment account number or payment device identifier again does not include a BIN, issuer identifier data, or its equivalent. In this embodiment, the payment account number or payment device identifier is obtained from the consumer or payment device using any suitable means, such as by the consumer providing data from the face of a credit card, debit card or smart card via a web-site, via a voice call, or by entering a command or data into a device (e.g., a mobile phone) that is capable of communicating with a merchant using a suitable communications network. The payment account number or payment device identifier data provided by the consumer is received by the payment processor and used to access or otherwise obtain the BIN or other form of issuer or routing data appropriate for the payment device. The BIN or other form of issuer identifier may be maintained in a database, lookup table, or other suitable data storage mechanism, with the payment account number or payment device identifier being used to retrieve the issuer identifier by means of a mapping (or other form of association) between the payment account number or payment device identifier and the corresponding issuer data.

Figure 4:
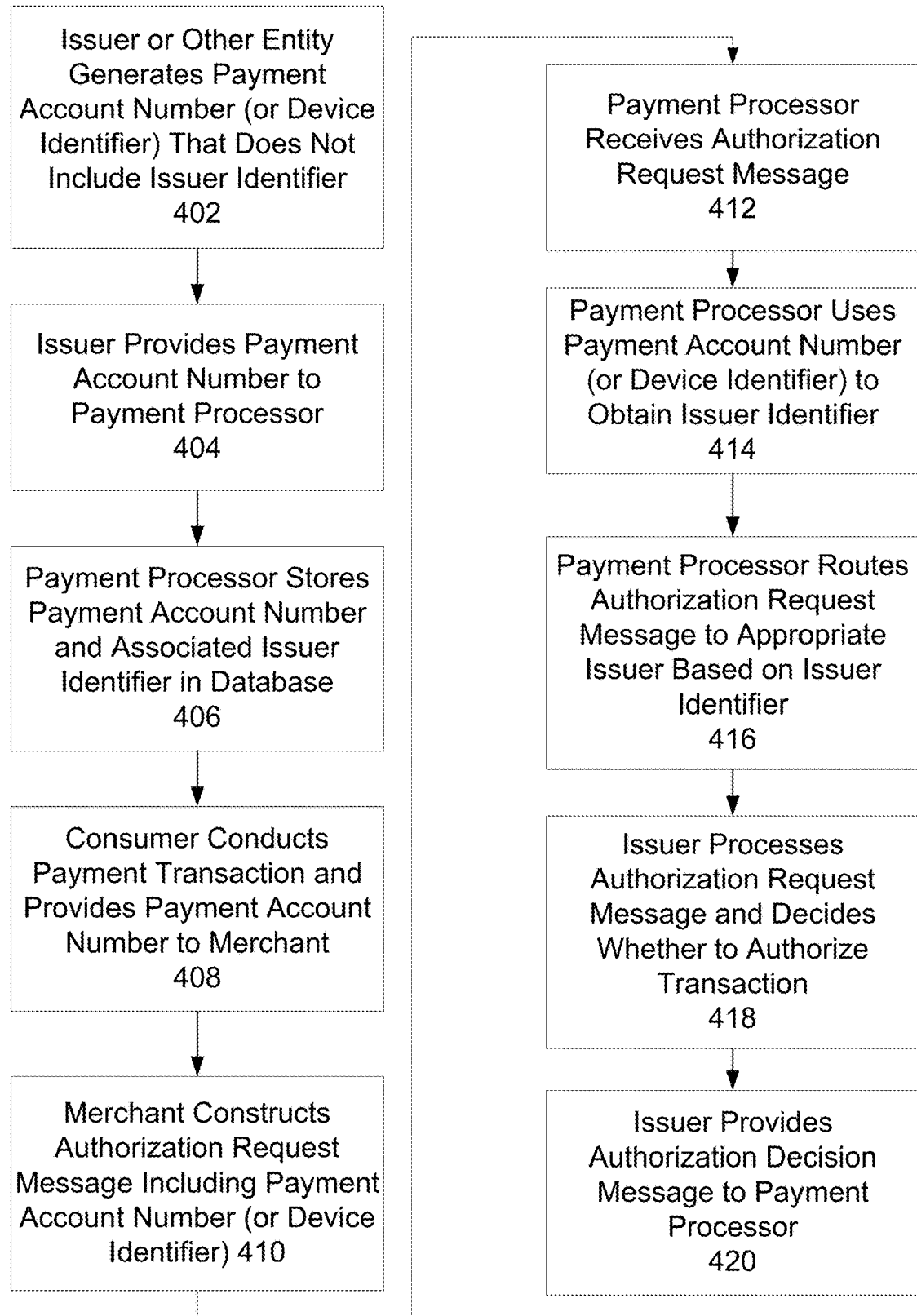
FIG. 4 is a flowchart illustrating a method of conducting a payment transaction in accordance with an embodiment of the present invention.

In a typical payment transaction conducted using this implementation, the generation of the payment account number or payment device identifier and the processing of a transaction using that data may be performed as follows, with reference to FIG. 4 which is a flowchart illustrating a method of assigning account identifiers and conducting a payment transaction in accordance with an embodiment of the present invention (note that some or all of the following steps may be characteristic of embodiments of the invention and that all steps need not be present in all embodiments of the invention):

- a payment processor (such as Visa) assigns a unique BIN to an issuing bank or other entity (e.g., a credit union);
- the issuer generates a payment card or device for a consumer—the card or device identifier (e.g., the PAN) does not use the issuer's BIN as a prefix and does not contain data identifying the issuer (stage 402 of FIG. 4);
- the payment processor or another entity maintains a database or other form of data structure (e.g., a lookup table) that contains an association between the payment card or device identifier and the issuer (stages 404 and 406);
- the issuer's data processing system updates the card or device number to issuer identifier (e.g., BIN) mapping maintained by the payment processor (or other entity) to reflect the issued payment card or payment device identifier (e.g., by means of real-time messages, pseudo real-time messages, or batch processing) (stage 406);
- the consumer conducts a payment transaction using the payment card or device—the payment account number or payment device identifier is provided to a merchant in any suitable manner (e.g., data entry on a merchant's web-site, via a voice call from the consumer, via data entry at a merchant's location, etc.) and an element of the merchant's data processing system (e.g., a server or other computing device) generates and forwards an authorization request message including the payment account number or the payment device identifier over a communications network to a server computer in a payment processing network operated by the payment processor, (stages 408 and 410);
- the server computer in the payment processing network operated by the payment processor receives the authorization request message and accesses a database or other form of data structure (e.g., a lookup table) that contains an association between the payment card or payment device identifier and the issuer to retrieve data identifying the issuer (stages 412 and 414);
- the server computer in the payment processing network operated by the payment processor processes the transaction in accordance with any instructions defined by or for the issuer, and re-formats and forwards an authorization request with the payment card or payment device identifier to the appropriate issuer (stage 416). Note that the message forwarded to the appropriate issuer need not contain the issuer identifier (e.g., the BIN or its equivalent) since that information is determined by the payment processor from the database and used to route the message; however, for purposes of quality control and to assure the issuer who receives the message that it is intended for that issuer, the payment processor may modify the incoming message so that the outgoing message provided to the issuer contains the issuer identifier; and
- the issuer makes a decision whether to approve or deny the transaction and sends an authorization response message indicating this decision back to the server computer in the payment processing network operated by the payment processor (stages 418 and 420); the authorization response message is then forwarded to the merchant via an acquirer's computer apparatus and a suitable communications network.

Figure 5:
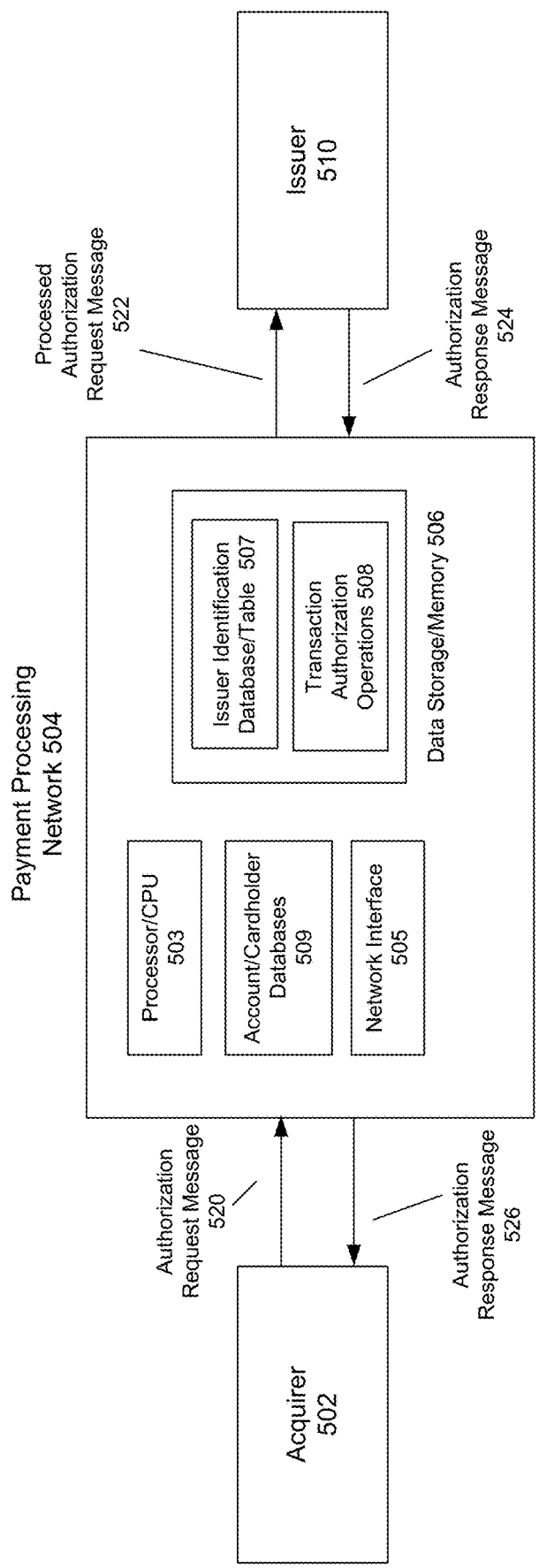
FIG. 5 is a functional block diagram illustrating a payment processing system including components of a payment processing network and elements that may interact with that network to enable a consumer to conduct a payment transaction using an embodiment of the inventive payment account number or payment device identifier.

FIG. 5 is a functional block diagram illustrating a payment processing system including components of a payment processing network 504 and elements that may interact with that network to enable a consumer to conduct a payment transaction using an embodiment of the inventive payment account number or payment device identifier. As shown in the figure, elements that interact with network 504 include an acquirer 502 which provides an authorization request message 520 for a payment transaction to payment processing network 504 (note that the authorization request message may have been generated in whole or in part by a data processing element of the merchant's data processing system). Payment processing network 504 may provide a processed authorization request message 522 to issuer 510 to assist issuer 510 in deciding whether to authorize or deny a transaction. Issuer 510 provides payment processing network 504 with an authorization response message 524 containing an indication of whether the transaction has been approved or denied. Authorization response message 526 (which may be the same as message 524, or may contain other information) is provided to acquirer 502 to inform acquirer 502 (and ultimately the merchant and consumer) if the transaction has been approved or denied.

In processing one or more of the transaction authorization messages, where such messages include transaction authorization request messages 520 and transaction authorization response messages 524, payment processing network 504 may utilize one or more of the components or elements depicted in FIG. 5. Such components or elements include a processor or central processing unit 503 that is programmed to execute a set of instructions, where some or all of those instructions may be stored in data storage device or memory 506. The instructions may include instructions which when executed, cause payment processing network 504 to perform one or more transaction authorization processing functions or operations (as suggested by instructions or instruction set 508) and/or operations to identify the issuer (or other entity) associated with the payment account or payment device being used to conduct a payment transaction (as suggested by instructions or instruction set 507). In performing these operations, processor or central processing unit 503 may access one or more databases 509 containing payment account, cardholder, or other relevant data, including, but not limited to, a database or lookup table that includes the previously described association between a payment device identifier and the issuer for that device (note that this information may also be part of a separate data storage element that is accessed when executing instruction set 507). Payment processing network 504 may utilize network interface 505 to enable communication with other elements depicted in FIG. 5 by means of a suitable communications network or channel.

There are many new or improved products and services that may be provided to consumers using an embodiment of the present invention. For example, use of a payment account number or payment device identifier in which the issuer identifier is decoupled from the account number or device identifier may enable an issuer, governmental agency, telecommunications carrier, payment processor, or other entity to provide one or more of the following:

customized or personalized products for consumers such as a PAN (or its equivalent) that is generated from a consumer's favorite numbers or a more easily remembered string of numeric or alphanumeric characters;

a PAN having a prefix that allows for market segmentation, tracking of the activities of market segments, and the provision of grades of service to consumers in different segments;

a PAN that is disassociated from any particular issuer, thereby allowing other entities (such as a payment processing network) to work directly with service providers (such as a telecommunications carrier) to provide new services to consumers that may be billed through channels other than a traditional issuer;

an integration of a payment account with other personal data or functions (such as identification cards, medical data cards, membership cards, government benefit cards, multi-use cards for a payment function and another function) in a manner that maintains a desired level of privacy and isolation of data for the consumer, while using a static account or device identifier that may be required for provision of those services (e.g., a governmental benefit card may necessitate a static account number so that the government entity can maintain proper administrative control and management of the benefit program);

a static PAN that can be implemented as part of a payment device embedded in another device (such as a mobile phone), thereby eliminating the need to issue or alter the phone or other device if a consumer changes banking institutions, etc.; and a combination of a static PAN and other information regarding a consumer (e.g., location) may enable the provision of additional services or provide added functionality for payment transactions.

In implementing embodiments of the present invention, it may be desirable to alter or modify elements or processes of a typical payment processing network in order to most effectively implement the invention. For example, implementation of the present invention may involve modifications to the payment device issuing process, the process used to generate the payment account identifiers, and the processing of transaction data (such as authorization request messages), among others.

Figure 6:
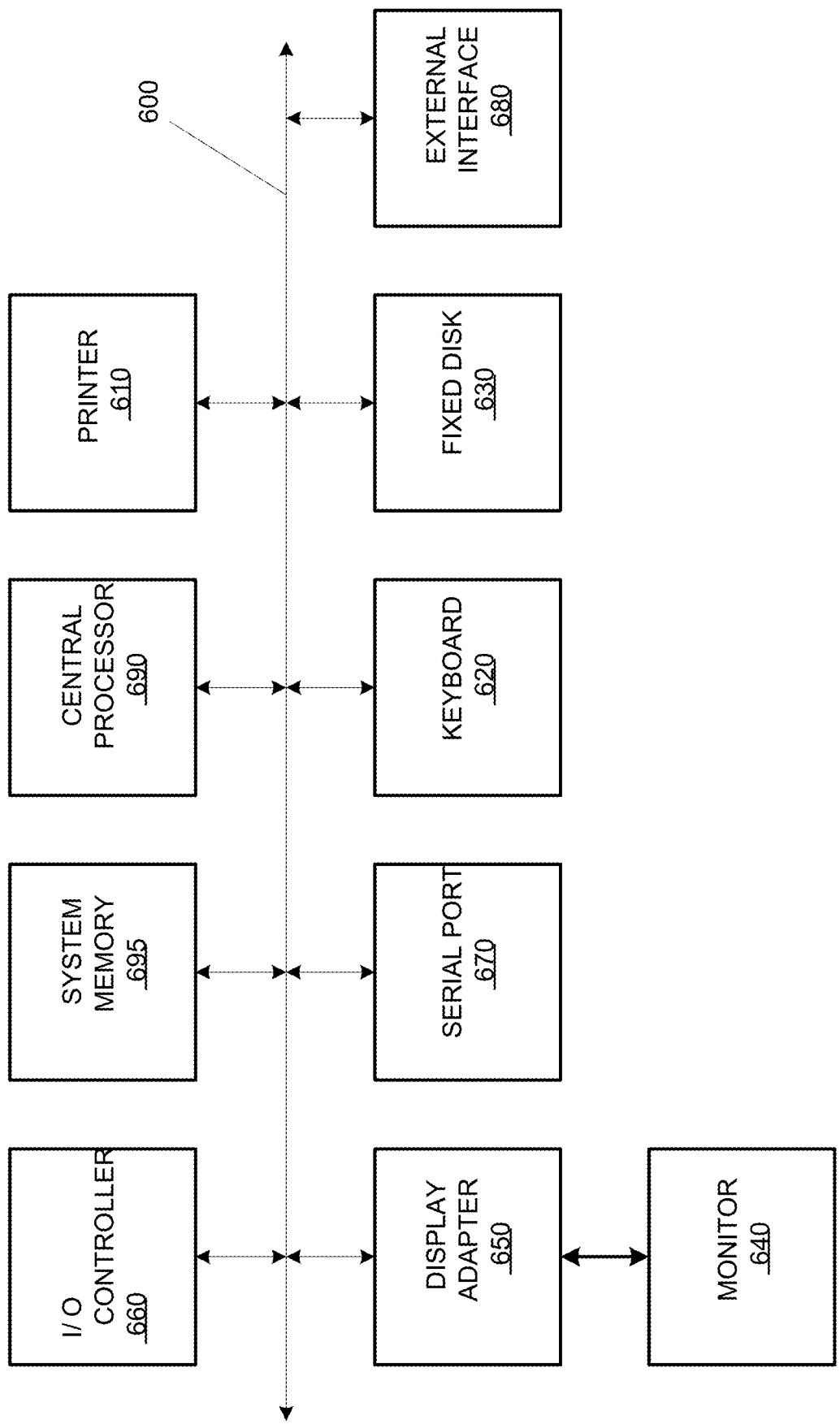
FIG. 6 is a block diagram of elements that may be present in a computer apparatus configured to execute a method or process to conduct a payment transaction using a portable PAN or other form of payment account or payment device identifier, in accordance with some embodiments of the present invention.

As discussed, in some embodiments, the inventive methods, processes or operations for conducting a payment transaction using a portable PAN may be wholly or partially implemented in the form of a set of instructions executed by a programmed central processing unit (CPU) or microprocessor. The CPU or microprocessor may be incorporated in an apparatus, server or other computing device operated by, or in communication with, a node of the authorization network. As an example, FIG. 6 is a block diagram of elements that may be present in a computer apparatus configured to execute a method or process to conduct a payment transaction using a portable PAN or other form of payment account or payment device identifier, in accordance with some embodiments of the present invention. The computer apparatus may be used in any of the components shown, for example, in FIGS. 1 and 5. The subsystems shown in FIG. 6 are interconnected via a system bus 600. Additional subsystems such as a printer 610, a keyboard 620, a fixed disk 630, a monitor 640, which is coupled to a display adapter 650, and others are shown. Peripherals and input/output (I/O) devices, which couple to an I/O controller 660, can be connected to the computer system by any number of means known in the art, such as a serial port 670. For example, the serial port 670 or an external interface 680 can be used to connect the computer apparatus to a wide area network such as the Internet, a mouse input device, or a scanner. The interconnection via the system bus 600 allows a central processor 690 to communicate with each subsystem and to control the execution of instructions that may be stored in a system memory 695 or the fixed disk 630, as well as the exchange of information between subsystems. The system memory 695 and/or the fixed disk 630 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art. For example, although the specific embodiments of the invention refer to payment transactions, it is also possible for embodiments of the invention to be used in non-payment transactions such as money transfer transactions.

As used herein, the use of "a", "an" or "the" is intended to mean "at least one", unless specifically indicated to the contrary.

What is claimed is:

1. An apparatus for processing a transaction, the apparatus comprising:
  an electronic processor programmed to execute a set of instructions which, when executed by the electronic processor, cause the apparatus to process the transaction by:
    receiving, from a point of sale terminal, an authorization request message for the transaction, the authorization request message comprising an account identifier data string associated with an account, wherein the point of sale terminal obtained the account identifier data string, and not information identifying an issuer for the account, from a payment device, the account identifier data string identifying the account used to conduct the transaction, wherein the account identifier data string associated with the account is an issuer-independent and portable account identifier that is used for processing the transaction;

determining the issuer for the account based on an issuer identifier data string, which is separate from the account identifier data string and identifies the issuer for the account, by accessing a database comprising a lookup data that contains an association between the issuer identifier data string and the account identifier data string;

reformatting the authorization request message to include the issuer identifier data string in addition to the account identifier data string, according to the issuer;

routing the reformatted authorization request message comprising the account identifier data string and the issuer identifier data string to an issuer computer operated by the issuer, wherein the issuer computer approves or denies the authorization request message and thereafter generates an authorization response message;

receiving the authorization response message; and forwarding the authorization response message to the point of sale terminal, wherein the issuer-independent and portable account identifier is decoupled from the issuer, and wherein the issuer-independent and portable account identifier is configured to be associated with another issuer, in conducting another transaction.

2. The apparatus of claim 1, wherein the account identifier data string is a payment account identifier data string comprising a string of numeric or alphanumeric data.

3. The apparatus of claim 2, wherein the string of numeric or alphanumeric data corresponds to a payment account number or payment device identifier associated with a credit card, debit card, or smart card.

4. The apparatus of claim 1, wherein the account used to conduct the transaction is later associated with a second issuer different from the issuer, the second issuer being identified using the account identifier data string associated with the account.

5. A method for processing a transaction, the method comprising:

receiving, by a server computer from a point of sale terminal, an authorization request message for the transaction, the authorization request message comprising an account identifier data string associated with an account, wherein the point of sale terminal obtained the account identifier data string, and not information identifying an issuer for the account, from a payment device, the account identifier data string identifying the account used to conduct the transaction, wherein the account identifier data string associated with the account is an issuer-independent and portable account identifier that is used for processing the transaction;

determining, by the server computer, the issuer for the account based on an issuer identifier data string, which is separate from the account identifier data string and identifies the issuer for the account, by accessing a database comprising a lookup data that contains an association between the issuer identifier data string and the account identifier data string;

reformatting, by the server computer, the authorization request message to include the issuer identifier data string in addition to the account identifier data string, according to the issuer;

routing, by the server computer, the reformatted authorization request message comprising the account identifier data string and the issuer identifier data string to an issuer computer operated by the issuer, wherein the issuer computer approves or denies the authorization request message and thereafter generates an authorization response message;

receiving, by the server computer, the authorization response message; and forwarding, by the server computer, the authorization response message to the point of sale terminal, wherein the issuer-independent and portable account identifier is decoupled from the issuer, and wherein the issuer-independent and portable account identifier is configured to be associated with another issuer, in conducting another transaction.

6. The method of claim 5, wherein the account identifier data string is a payment account identifier data string comprising a string of numeric or alphanumeric data.

7. The method of claim 6, wherein the string of numeric or alphanumeric data corresponds to a payment account number or payment device identifier associated with a credit card, debit card, or smart card.

8. A non-transitory computer-readable medium storing instructions which, when executed by a processor, cause the processor to perform a method of processing a transaction, the method including:

receiving, from a point of sale terminal, an authorization request message for the transaction, the authorization request message comprising an account identifier data string associated with an account, wherein the point of sale terminal obtained the account identifier data string, and not information identifying an issuer for the account, from a payment device, the account identifier data string identifying the account used to conduct the transaction, wherein the account identifier data string associated with the account is an issuer-independent and portable account identifier that is used for processing the transaction;

determining the issuer for the account based on an issuer identifier data string, which is separate from the account identifier data string and identifies the issuer for the account, by accessing a database comprising a lookup data that contains an association between the issuer identifier data string and the account identifier data string;

reformatting the authorization request message to include the issuer identifier data string in addition to the account identifier data string, according to the issuer;

routing the reformatted authorization request message comprising the account identifier data string and the issuer identifier data string to an issuer computer operated by the issuer, wherein the issuer computer approves or denies the authorization request message and thereafter generates an authorization response message;

receiving the authorization response message; and forwarding the authorization response message to the point of sale terminal, wherein the issuer-independent and portable account identifier is decoupled from the issuer, and wherein the issuer-independent and portable account identifier is configured to be associated with another issuer, in conducting another transaction.

9. The non-transitory computer-readable medium of claim 8, wherein the account identifier data string is a payment account identifier data string comprising a string of numeric or alphanumeric data.

10. The non-transitory computer-readable medium of claim 9, wherein the string of numeric or alphanumeric data corresponds to a payment account number or payment device identifier associated with a credit card, debit card, or smart card.

* * * * *